Dec. 9, 1924.
A. A. ELNITSKY
BUMPER
Filed Oct. 30, 1923
1,518,779
2 Sheets-Sheet 1
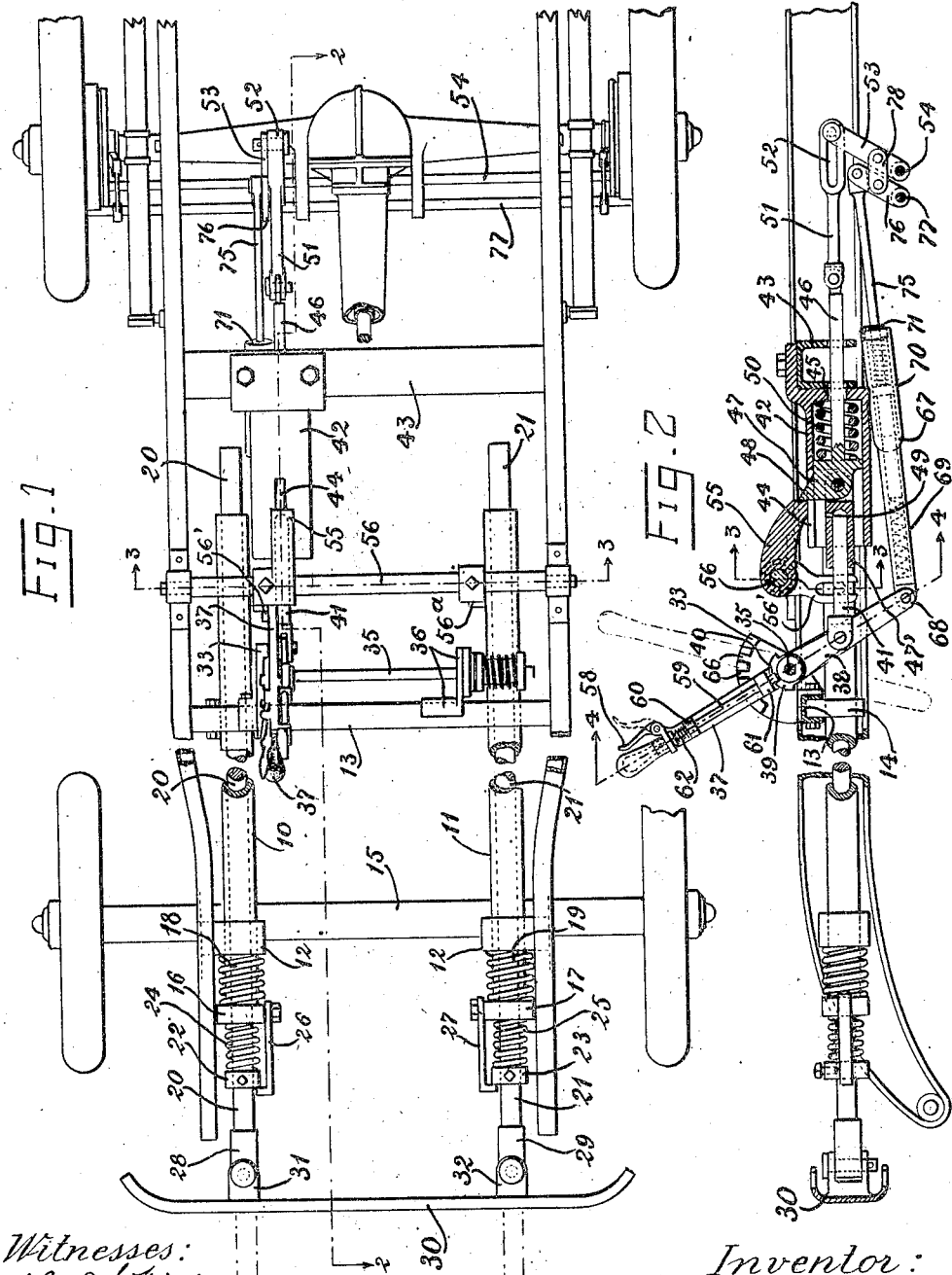
Witnesses:
Chas. S. Williams
Achilles Rovegno
Inventor:
Anthony A. Elnitsky
By his Att'y
P. H. Richards

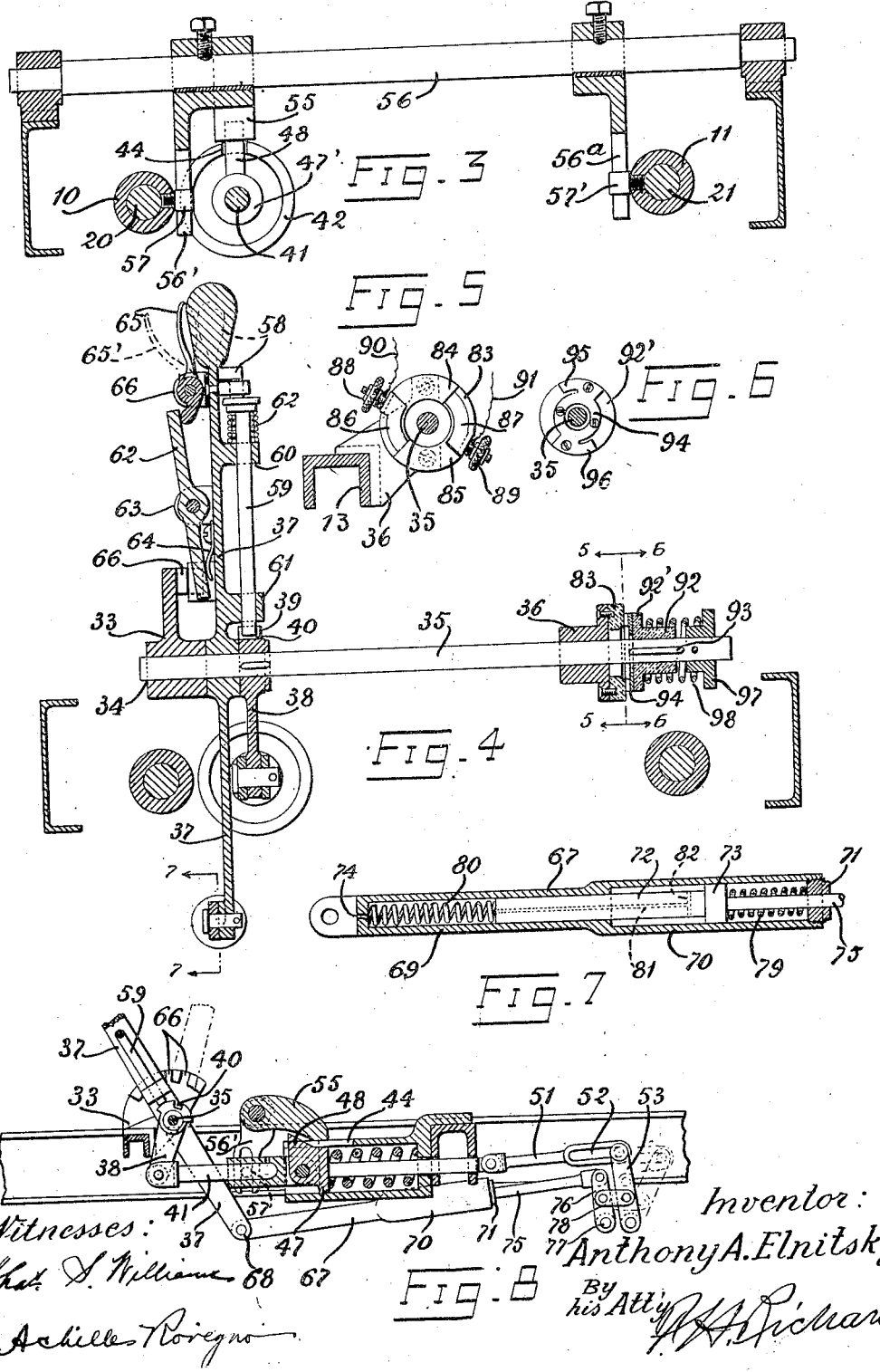

Patented Dec. 9, 1924.

1,518,779

UNITED STATES PATENT OFFICE.

ANTHONY A. ELNITSKY, OF NEW YORK, N. Y.

BUMPER.

Application filed October 30, 1923. Serial No. 671,736.

*To all whom it may concern:*

Be it known that I, ANTHONY A. ELNITSKY, a citizen of the present Government of Russia, residing in New York, in the county and State of New York, have invented certain new and useful Improvements in Bumpers, of which the following is a specification.

The present invention relates to fenders or bumpers for vehicles, and particularly to vehicles having emergency brakes, and one object of the invention is to provide a fender or bumper which is extensible from the front of the vehicle, whereby the distance of said fender or bumper from the front of the vehicle may be varied.

Another object of the invention is to provide a device employing a fender or bumper whereby when the fender or bumper comes into contact with an obstacle the emergency brakes of the vehicle are automatically applied.

Another object is to provide a device of the character mentioned whereby the emergency brakes are applied with great rapidity but are not applied instantaneously, thereby avoiding the sudden shock and jarring effect of application of the brakes.

Another object is to provide a device of the character mentioned by which, when the emergency brakes are automatically applied, these brakes may be immediately returned to unapplied or normal position by the driver of the vehicle without necessity for him to leave his seat.

Another object is to provide a device of the character described, which in addition to applying the brakes automatically, also automatically disconnects or cuts the ignition circuit of the vehicle, thereby preventing firing of the gases in the cylinders.

Another object is to provide a device of the character described, which in addition to applying the brakes automatically, also automatically disconnects or cuts the ignition circuit of the vehicle, thereby preventing firing of the gases in the cylinders and causing compression of the unfired gases in the cylinders by momentum of the pistons, whereby, if the clutch is not released, said action of the pistons has an additional brake effect upon the rear wheels of the vehicle.

I obtain these objects, and such other objects as may hereinafter appear, by the invention one of the possible embodiments of which is described by way of example in the subjoined specification and shown in the accompanying drawings forming part of the specification, in which Figure 1, is a plan view of the device attached to the chassis of a motor vehicle.

Fig. 2 is a fragmental view on the line 2—2 of Fig. 1, showing the device set for applying the brake, the pawl being in engagement with the ratch and the actuating spring being compressed.

Fig. 3 is a view partly in section on the line 3—3 of Figs. 1, and 2, viewed in the direction of the arrows.

Fig. 4 is a sectional view on the line 4—4 of Fig. 2, viewed in the direction of the arrows.

Fig. 5 is a sectional view on the line 5—5 of Fig. 4, of a make and break device viewed from the right hand side of the device.

Fig. 6 is a face view on the line 6—6 of Fig. 4, of a movable part of the make and break device viewed from the left hand side of the device.

Fig. 7 is a detail view on the line 7—7 of Fig. 4 viewed in the direction of the arrows, of a tubular connecting member, and Fig. 8 is a fragmental view partly in section of a portion of the device as shown in Fig. 2, the pawl being disengaged from the ratch and the actuating spring being distended.

Similar reference characters denote similar parts throughout the several views.

Referring to Figs. 1 and 2, the tubular members 10 and 11 are secured forwardly to the side sills of the chassis of the motor vehicle by the brackets 12 and are secured rearwardly to the cross-sill 13 by the brackets 14, one of which is seen in Fig. 2, the tubular members 10 and 11 being located over the axle 15 and under the cross-sill 13 and being slidably movable in the brackets.

The tubular members 10 and 11 have fixed thereon the apertured heads 16 and 17, and the springs 18 and 19 are arranged around the tubular members between the heads 16 and 17 and the brackets 12, the tendency of these springs being to pull the tubular members forwardly.

The rods 20 and 21 are arranged in the tubular members 10 and 11, these rods extending forwardly of the heads 16 and 17 and rearwardly of the rear ends of the tubular members, the rods being slidably movable in the tubular members and capable of being drawn forwardly as shown in outline in Fig. 1. The rods 20 and 21 have thereon near their forward ends the adjustable collars 22 and 23, the springs 24 and 25 being tensioned around the rods between the heads 16 and 17 and the collars 22 and 23 with tendency to push the rods forwardly, the rods being extensible by releasing the collars 22 and 23 by means of the set screws appurtenant thereto and releasing the spring strips 26 and 27 secured at their rear ends to the heads 16 and 17 and having hooked forward ends engaging the forward faces of the collars 22 and 23, the purpose of the strips 26 and 27 being to prevent accidental or unintentional extension of the rods 20 and 21. The rods 20 and 21 have on their forward ends the heads 28 and 29.

The fender or bumper 30 is a metal bar having rearwardly turned ends. The fender 30 is provided on its rear near its ends with the yokes 31 and 32 to which the heads 28 and 29 are pivotally connected whereby pivotal movement of the fender is permitted.

Thus it will be seen that a fender is provided which, in outlying or districts where the traffic is not crowded may be spaced away a decided distance from the front of the vehicle and which when brought into contact with an obstacle travels inwardly towards the front of the vehicle through relatively long space, during which travel the shock is received by the springs 24 and 25 and 18 and 19, and all conducing to the protection of the front of the vehicle from injury.

Referring to Figs. 1. 2, 4 and 8, the sector bracket 33 is secured at its lower end to the cross-sill 13 in position adjacent to the bracket 14, the bracket 33 having the bore 34, Fig. 4, which rotatably supports the shaft 35 at one end of the shaft, this shaft being rotatably supported at its opposite end in the bracket 36 secured to the cross-sill 13. The emergency brake lever 37 is supported about midway of its length for free swinging movement on the shaft 35 at one side of the sector bracket 33, the lower end of this lever extending below the lower line of the side sill 10 for the purpose later stated. The lever 38 having a segmental head portion 39 with a recess 40 therein, is keyed at its head portion to the shaft 35 for rotating the shaft, the lower end of the lever 38 being pivotally connected to the head of the plunger 41, the purpose of the recess 40 being later stated.

The casing 42 is secured at its rear end to the cross-sill 43, this casing having the slot 44 in the upper side of its forward end, and having through its rear wall the aperture 45, the cross-sill 43 having therethrough apertures registering with the aperture 45. The stem 46 of the piston head and ratch 47 passes through the apertures of the cross-sill 43 and through the aperture 45 and has on its forward end the combined piston head and ratch, the engaging face 48 of the ratch extending upwardly through the slot 44. The combined piston head and ratch is pivotally connected to the hollow cylindrical member 47' having the air vent 49, the plunger 41 being movable in the cylindrical member 47'. The actuating spring 50 is arranged in the interior of the casing 42 between the rear wall of the casing and the combined piston head and ratch 47, the tendency of this spring being to move the piston head and ratch forwardly. The stem 46 of the piston head and ratch is pivotally connected at its rear end to the link 51 having the elongated slotted end 52, to which the link 53 is connected for swinging movement of the link, this link being secured at its lower end to the compensating axle 54 of the emergency brake of the vehicle for operating the brake.

The pawl 55 is fixedly secured to the shaft 56 for movement with the shaft, the shaft being journalled at its ends on the side sills. The pawl 55 has as part thereof and movable therewith the forked member 56' which straddles the pin 57 (Fig. 3) fixed on the exterior of the tubular member 10.

It will be noted that if the tubular members 10 and 11 are moved rearwardly through contact with an obstacle, due to the movement of the pin 57 with the tubular member 10 and the engagement of said pin with the forked member 56', the pawl 55 will be moved upwardly and out of engagement with the face 48 of the ratch. whereupon the actuating spring 50 then being in compressed position it will be released, and acting on the combined piston head and ratch 47 will move the plunger 47' forwardly and also will thereby exert forward pulling force upon the link 51 and in turn upon the link 53 for thereby applying the emergency brakes.

For setting or compressing the spring 50 after application of the emergency brakes, without necessity for the driver to leave his seat, the emergency brake hand lever 37 on the handle thereof is provided with the grip lever 58 which operates the rod 59 which is slidably movable in the guides 60 and 61, this rod being upwardly pressed by the spring 62, the lower end of the rod being engageable in the recess 40 in the head of the lever 38, whereby the hand lever 37 and the lever 38 are by operation of the grip lever 58 held in rigid relation for compressing the spring 50 when the lower end of said rod is engaged in said recess, the rod 59 when the spring 50 is compressed and held by pawl 55 being disengageable from the recess 40 by release of the grip lever 58. The brake lever 37 has on its side opposite to the rod 59 the swinging lever 62 pivoted on the lug 63 on the brake lever 37. The lever 62 is normally outwardly pressed at its lower end by the spring 64 secured to the side of the hand lever 37, and is outwardly pressed at its upper end by the lower end of the grip lever 65 pivoted on the lug 66 on the side of the hand lever 37, this outer pressure tending to press the lower end of the swinging lever inwardly against the spring 64. Thus when the grip lever 65 is in the position 65' shown in Fig. 5, the swinging lever will be engaged in one of the recesses 66 of the sector bracket 33 whereby the hand lever 37 is maintained in either forward, vertical or rearward position, the swinging lever 62 being disengageable from any recess 66 by operation of the grip lever 65, whereby the brake hand lever 37 may also be moved freely after the operation of compressing the spring 50.

Referring to Figs. 2, 7 and 8, for applying the emergency brakes of the vehicle with rapidity which is substantially instantaneous but in a manner which greatly reduces, if not entirely obviates, the shock of the application, the tubular member 67 is pivotally connected at its forward end as at 68, to the lower end of the brake lever 37. The tubular member 67 comprises the forward extension 69 and the enlargement 70. The interior of the enlargement 70 has at its rear end the apertured head 71 and communicates at its forward end with the interior of the extension 69. The enlargement 70 has therein the piston plunger 72, the piston head 73 of which engages the interior of the enlargement 70 in air tight manner and the plunger portion of which engages in air tight manner the interior of the extension 69 which is closed at its forward end except for the air vent 74. The stem 75 of the plunger extends rearwardly through the head 71 and is pivotally connected to the upper end of the link 76 which is pivotally connected at its lower end to the compensating rod 77 of the emergency brake of the vehicle, the link 76 being arranged in parallelism to the link 53 and pivotally connected thereto by the cross link 78. The spring 79 is arranged in the interior of the enlargement 70 around the stem 75 between the head 71 and the piston head 73, and the spring 80 of greater strength than the spring 79 is arranged in the interior of the extension 69 between the end of the plunger and the front end wall of said interior, the tension of the spring 79 being sufficient to retain the end of the plunger in engagement with the end of the spring 80. The plunger portion of the piston plunger 72 has longitudinally therein the bore 81 communicating at its forward end with the interior of the extension 69 and communicating at its rear end with the transverse bore 82. Thus it will be noted upon contact of the fender 30 with an obstacle and expansion of the spring 50, the link 53 will be pulled forwardly, and through cooperation of the cross link 78 the link 76 will be pushed forwardly thereby forcing forwardly the piston plunger 72 which compresses the spring 80 and compresses the air in the interior of the extension 69 and enlargement 70, the compression of the spring 80 and said air counteracting the expansion of the spring 50, and while permitting rapid and substantially instantaneous expansion of the spring 50 when an obstacle is struck by the fender 30, the emergency brakes are applied in such manner that the shock or jar upon the vehicle is very greatly mitigated.

Referring to Figs. 1, 4, 5 and 6, for making and breaking the ignition circuit, the bracket 36 secured to the cross-sill 13 supports the dielectric disk 83 having thereon raised segmental portions 84 and 85 between which are secured the segmental portions 86 and 87 of conductive material, the portions 86 and 87 being provided with the binder posts 88 and 89 connected by the wires 90 and 91 to the ignition circuit of the vehicle. The hub 92 of dielectric material is movable on the shaft 35 by means of a slot, not seen, in the hub engaging the key 93 on the shaft. The flange 92' of the hub has thereon the substantially reverse S-shaped contact plate 94 having upwardly turned end portions 95 and 96 which are contactible with the conductive segmental portions 86 and 87. In position slightly spaced away from the outer side of the hub 92 the stop collar 97 is secured to the shaft 35, and the spring 98 is arranged between the hub 92 and the stop collar 97 with tendency to retain the plate 94 in contact with the disk 83. Thus it will be noted that, if the shaft 35 be partially rotated by the lever 38, Fig. 4, upon contact of the fender 30 with an obstacle while the ends 95 and 96 of the plate 94 are in contact with the portions 86 and 87 of the disk 83, these ends will be moved into contact with the portions 84 and 85 of the disk 83, whereby the ignition circuit will be broken or cut and firing of the gases in the engine cylinders will be prevented. Due to momentum of the engine pistons the unfired gases will be compressed in the cylinders thereby, if the clutch of the engine has not been released, applying additional brake effect upon the rear wheels of the vehicle.

When the device is again set by the driver for application of the emergency brakes, the ignition circuit will be again operatively connected. By referring to Figs. 1 and 3, it will be noted that the forked member 56' is mounted on the shaft 56, the pawl being omitted, and engages the pin 57 on the interior of the tubular member 11 on that side of the frame, for operating the shaft 56, when the contact of the fender is with an obstacle on that side of the fender. Thus too it will be seen that contact of the fender with an obstacle at either of the ends or at the mid-portion of the fender will operate either of the tubular members and thereby apply the emergency brakes.

Having thus described my invention, it should be understood that there may be modifications thereof and variations therein without departing from the spirit of the invention, or exceeding the scope of the appended claims.

What I claim and desire to protect by Letters Patent is:—

1. In combination, a vehicle provided with emergency brakes; a fender yieldably supported in normal operative position near the front of the vehicle and movable forwardly to operative position relatively remote from the front of the vehicle; and mechanism cooperating between the fender and said emergency brakes for automatically applying the brakes when the fender is in either the near or remote operative position and is yieldingly moved by contact with an obstacle.

2. In combination, a vehicle provided with emergency brakes; a fender yieldably supported in normal operative position near the front of the vehicle and removable forwardly to operative position relatively remote from the front of the vehicle; mechanism cooperating between the fender and said emergency brakes for automatically applying the brakes when the fender is yieldably moved by contact with an obstacle; and means for setting said mechanism for applying the emergency brakes after prior operation of the mechanism.

3. In combination, a vehicle provided with emergency brakes; a fender supported normally in operative position near the front of the vehicle and movable forwardly to operative position relatively remote from the front of the vehicle; means for yieldably maintaining the fender in either the near or remote operative position, the tension of said means being the same when the fender is in either near or remote operative position; and mechanism co-operating between the fender and said emergency brakes for automatically applying the brakes when the fender is in either the near or remote operative position and is yieldably moved by contact with an obstacle.

4. In combination, a vehicle provided with emergency brakes; a fender supported normally in operative position near the front of the vehicle and movable forwardly to operative position relatively remote from the front of the vehicle; helix springs for maintaining the fender in either the near or remote operative position, the tension of said springs being the same when the fender is in either near or remote operative position; and mechanism co-operating between the fender and said emergency brakes for automatically applying the brakes when the fender is in either the near or remote operative position and is yieldably moved by contact with an obstacle.

5. In combination, the frame of a vehicle having emergency brakes; tubular members supported by the frame for movement in the longitudinal line of the frame; rods supported by said members for movement in the longitudinal line of the frame; a fender carried by said rods and movable forwardly from normal operative position near the front of the frame to operative position relatively remote from the front of the frame; means co-operating with the tubular members and rods for yieldably maintaining the fender in either the near or remote operative position; and mechanism cooperating between said tubular members and the emergency brakes whereby when the fender is yieldably moved by contact with an obstacle the tubular members are moved for operating the mechanism for automatically applying the emergency brakes.

6. In combination, the frame of a vehicle having emergency brakes; tubular members supported by the frame for movement in the longitudinal line of the frame; rods supported by said members for movement in the longitudinal line of the frame; a fender carried by said rods and movable forwardly from normal operative position near the front of the frame to operative position relatively remote from the front of the frame; means co-operating with the tubular members and rods for yieldably maintaining the fender in either the near or remote operative position, the tension of said means being the same when the fender is in either near or remote operative position; and mechanism co-operating between said tubular members and the emergency brakes whereby when the fender is yieldably moved by contact with an obstacle the tubular members are moved for operating the mechanism for automatically applying the emergency brakes.

7. In combination, the frame of a vehicle having emergency brakes; tubular members supported by the frame for movement in the longitudinal line of the frame; rods supported by said members for movement in the longitudinal line of the frame; a fender carried by said rods and movable forwardly from normal operative position near the front of the frame to operative position relatively remote from the front of the frame; helix springs co-operating with the tubular members and rods for yieldably maintaining the fender in either the near or remote operative position; and mechanism co-operating between said tubular members and the emergency brakes whereby when the fender is yieldably moved by contact with an obstacle the tubular members are moved for operating the mechanism for automatically applying the emergency brakes.

8. In combination, the frame of a vehicle having emergency brakes; tubular members supported by the frame for movement in the longitudinal line of the frame; rods supported by said members for movement in the longitudinal line of the frame; a fender carried by said rods and movable forwardly from normal operative position near the front of the frame to operative position relatively remote from the front of the frame; helix springs co-operating with the tubular members and rods for yieldably maintaining the fender in either the near or remote operative position, the tension of said springs being the same when the fender is in either near or remote operative position; and mechanism co-operating between said tubular members and the emergency brakes whereby when the fender is yieldably moved by contact with an obstacle the tubular members are moved for operating the mechanism for automatically applying the emergency brakes.

9. In combination, the frame of a vehicle having emergency brakes; tubular members supported by the frame for movement in the longitudinal line of the frame; rods supported by said members for movement in the longitudinal line of the frame; a fender carried by said rods and movable forwardly from normal operative position near the front of the frame to operative position relatively remote from the front of the frame; means cooperating with the tubular members and rods for yieldably maintaining the fender in either the near or remote operative position; mechanism cooperating between said tubular members and the emergency brakes whereby when the fender is yieldably moved by contact with an obstacle the tubular members are moved for operating the mechanism for automatically applying the emergency brakes; and means cooperating between said mechanism and the emergency brakes for causing substantially instantaneous application of the brakes and mitigating the shock resulting from the application.

10. In combination, a vehicle provided with emergency brakes; a fender yieldably supported in operative position near the front of the vehicle; and mechanism cooperating between the fender and said emergency brakes for automatically applying the brakes when the fender is yieldingly moved by contact with an obstacle and resistance means cooperating with said brake mechanism for mitigating the shock resulting from the application of the brake.

ANTHONY A. ELNITSKY.

Witnesses:
CHAS. S. WILLIAMS,
ACHILLE ROVEGNO.